United States Patent [19]
Christensen et al.

[11] 4,198,792
[45] Apr. 22, 1980

[54] CHELATE-MODIFIED POLYMERS FOR ATMOSPHERIC GAS CHROMATOGRAPHY

[76] Inventors: Robert A. Frosch, Administrator of the National Aeronautics and Space Administration, with respect to an invention of Warren W. Christensen; Ludwig A. Mayer, both of San Jose; Fritz H. Woeller, Sunnyvale, all of Calif.

[21] Appl. No.: 921,626

[22] Filed: Jun. 30, 1978

[51] Int. Cl.² .............................. C08J 9/40; C08J 3/10; B01D 53/20
[52] U.S. Cl. .......................................... 521/55; 55/66; 55/67; 55/68; 55/72; 521/146; 521/918; 525/4
[58] Field of Search ...................... 55/66, 68, 72, 67; 526/4; 521/53, 55, 146, 918; 525/4

[56] References Cited
U.S. PATENT DOCUMENTS

| | | | |
|---|---|---|---|
| 2,508,490 | 5/1950 | Calvin et al. | 260/439 |
| 3,554,996 | 1/1971 | Beck | 526/4 |
| 3,650,090 | 3/1972 | Temple | 55/31 |
| 3,822,530 | 7/1974 | Fuller et al. | 55/67 |
| 3,933,770 | 1/1976 | Ikeda et al. | 526/4 |

OTHER PUBLICATIONS

Synthetic Oxygen Carriers of Biological Interest Basolo et al., 4/2/75.

*Primary Examiner*—John Kight, III
*Attorney, Agent, or Firm*—Armand McMillan; John R. Manning; Darrell G. Brekke

[57] ABSTRACT

New chromatographic materials have been developed to serve as the stationary phase of columns used in the separation of atmospheric gases. These materials consist of a crosslinked porous polymer matrix, e.g., a divinylbenzene polymer, into which has been embedded an inorganic complexed ion such as N,N'-ethylene-bis-(acetylacetoniminato)-cobalt (II). Organic nitrogenous bases, such as pyridine, may be incorporated into the chelate polymer complexes to increase their chromatographic utility. With such materials, the process of gas chromatography is greatly simplified, especially in terms of time and quantity of material needed for a gas separation.

10 Claims, 5 Drawing Figures

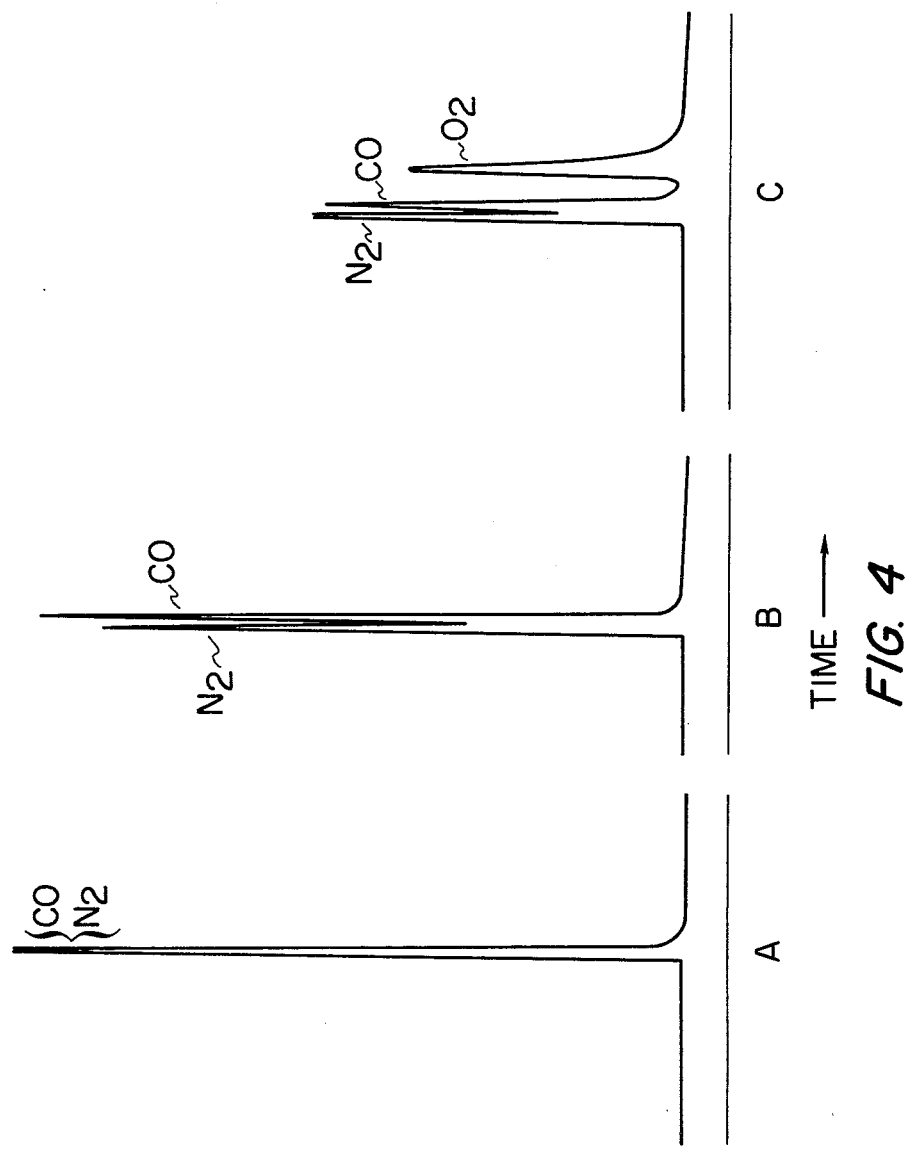

CHELATE-MODIFIED POLYMERS FOR ATMOSPHERIC GAS CHROMATOGRAPHY

ORIGIN

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The present invention relates to the separation and identification of components of gas mixtures by chromatography, and more particularly to a new concept in the formulation of the stationary phase utilized in the chromatographic column.

2. Description of the Prior Art

Mixtures of gases have been separated by various means including chromatography on a column packed with various polymers or molecular sieves. The packing material may be microporous and/or may consist of microsphere or other fine particulate structures. Thus, mixtures of nitrogen, carbon monoxide, carbon dioxide, hydrogen, water vapor, and hydrocarbon gases have been separated successfully with a microporous crosslinked polymer made of about 80% monovinyl monomer and 20% divinyl monomer (U.S. Pat. No. 3,650,090). A stream of gaseous hydrocarbons can be analyzed by means of a column of glass beads covered by a polymeric film deposited in situ, said film being composed of the usual divinyl and monovinyl monomer ratio (U.S. Pat. No. 3,822,530). In any event, while it is possible to obtain separation of oxygen from nitrogen in an atmospheric mixture of gases with certain porous carbon molecular sieves, long columns and long processing times are needed to isolate oxygen in the presence of argon.

The separation of oxygen from other gases has also been attempted with the help of chelates. For example, it has been found that cobalt salicylaldehydeethylenediamine dissolved in pyridine or packed in a column with inert material can separate oxygen from air by absorption at cool temperatures and desorption at 100° C. (U.S. Pat. No. 2,508,490). N,N'-ethylenebis-(acetylacetoniminato)-cobalt (II), i.e., Co(acacen), when placed in a coordinating solvent such as dimethyl formamide or in a noncoordinating solvent such as toluene with a base like pyridine, will slowly absorb oxygen over a period of days. At temperatures near or lower than 0° C., a rapid and reversible uptake of dioxygen has been observed [Basolo et al., Accounts of Chem. Res. 8, 384–392 (1975)].

Finally, certain transition metal complexes such as diethylpyridyl nickel have been recently combined with, for example, halogenated styrene-divinyl benzene copolymer (U.S. Pat. No. 3,933,770). The resulting metal-polymer complex served, in that instance, to catalyze the dimerization of ethylene to butene.

An object of the present invention is to provide a new type of chromatographic column packing material which can simplify and improve the separation of atmospheric gases in terms of time, quantity of material needed and sharpness of separation. Another object is to devise chromatographic processes which will separate various common mixtures of oxygen and carbon monoxide in nitrogen, a separation that has been difficult heretofore. A further object is to devise methods for the manufacture of the chelate-polymer complexes of the invention which insure that said complexes have the proper steric configuration that is necessary to achieve the desired degree of absorption and desorption of gases.

SUMMARY OF THE INVENTION

It has now been discovered that the separation and identification of gas mixtures, especially those typical of planetary atmospheres, can be greatly improved in terms of time and quantity of material needed by the use of a chromatographic column system in which the stationary phase is composed of two distinct components, namely a polymeric matrix into which has been embedded an inorganic complexed ion compound or chelate.

The polymeric material, e.g., a crosslinked copolymer of monovinyl and divinyl monomers, provides a stationary porous substrate through which gas mixtures can diffuse. Although polymeric stationary phases are known to possess inherent gas separating capacities, the present system utilizes the polymer matrix as a host environment for fixedly retaining a metal chelate compound, e.g., N,N'-ethylene-bis(acetylacetoniminato)-cobalt (II). These compounds then selectively, differentially and reversibly interact with the components of the diffusing gas mixtures, thus effecting rapid, quantitative separations.

BRIEF DESCRIPTION OF THE DRAWINGS

FIG. 4 shows the utility of the chelate-polymer complexes of the invention in separating carbon monoxide from nitrogen and from mixtures of oxygen and nitrogen.

DETAILED DESCRIPTION OF THE INVENTION

Figure 1:
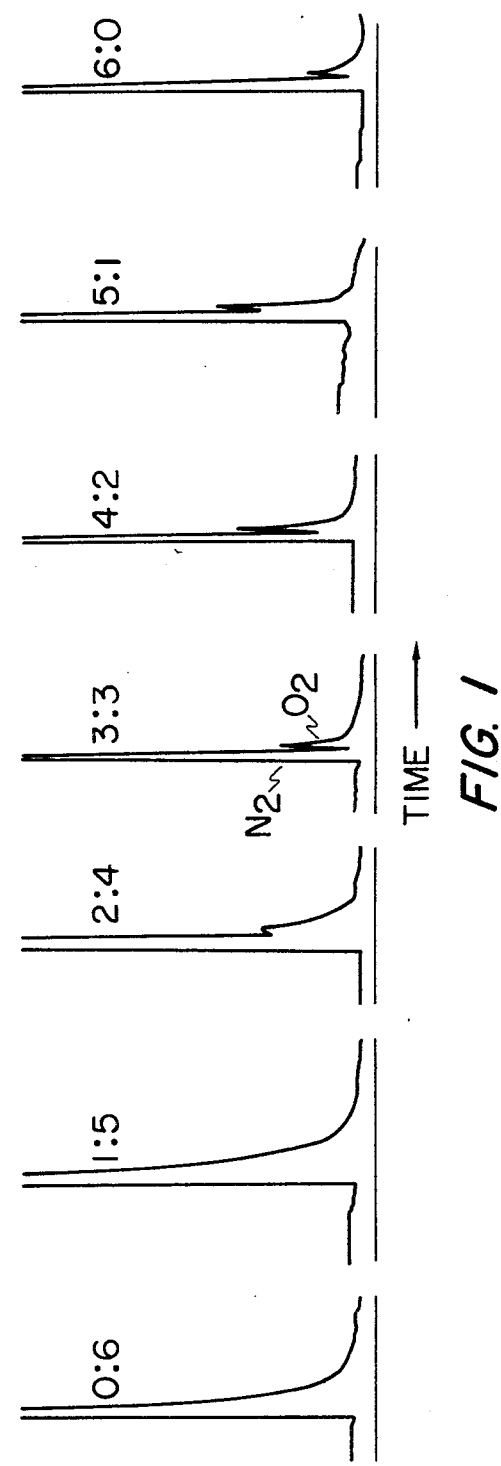
FIG. 1 shows seven chromatograms which depict the effect of variations in the heptane-toluene ratio used in the first stage polymerization of the polymer portion of the polymer-chelate complex.

The chromatographic column employed to carry out the atmospheric gas separations of this invention differs from that of the prior art in that the polymeric stationary phase through which the gas mixture is allowed to diffuse is combined with an inorganic complexed ion or chelate compound. The polymeric materials that can be used for this purpose can be any of the conventional crosslinked, finely divided, microporous organic polymers, generally formed by polymerizing at least one divinyl aromatic hydrocarbon monomer and at least one monoethylenically unsaturated monomer copolymerizable therewith, selected from monocyclic monovinyl aromatic hydrocarbons, N-vinyl pyridine and N-vinyl pyrrolidone. The usable polymers are prepared by bulk or suspension polymerization processes in the presence of a suitable quantity of a nonpolar organic liquid to provide the necessary porosity in the final polymer. Diethylbenzene and n-heptane-toluene mixtures are preferred for divinyl benzene copolymers into which Co(acacen) is to be incorporated.

The inorganic complexed ion compounds or chelates that can be embedded into the polymer matrix include such compounds as cobalt salicylaldehyde ethylenediamine (salcomine) and other cobalt complexes made with derivatives of salicylaldehyde such as 3-fluorosalicylaldehyde; cobalt acetylacetoneethylenediamine [Co(acacen)], iron imidazole salts, iron tetraphenylporphyrin, and the like. The proportion of inorganic complexed ion compound to polymer matrix necessary varies with the entities involved as well as with the gaseous components to be separated. In the case of Co(acacen) combined with crosslinked polydivinyl benzene, however, it has been found that usable contents of chelate per gram of polymer range from as little as about 0.025 g to as much as 0.2 g or more, different levels of chelates being favored for different gas mixtures.

It has been found desirable, and even necessary in some instances such as for the chromatography of undiluted air, to incorporate into the polymer-chelate complex an organic nitrogenous base capable of coordinating with the chelate compound. Such a base, when used, should be present in a concentration that is preferably about two to four times greater than that of the chelate on the polymer. Usable bases for this purpose include pyridine and its various substituted derivatives such as aminopyridine, cyanopyridine, vinyl pyridine, as well as imidazoles, pyrazoles, and the like.

Synthesis of Co(acacen)
[N,N'-ethylenebis(acetylacetoniminato)cobalt (II)]

Co(acacen) was synthesized by refluxing $Co(OH)_2$ with an excess of acetylacetonethylenediamine dissolved in a minimum of acetone for six to eight hours.

The $Co(OH)_2$ was prepared by adding a hot saturated aqueous solution of $CoCl_2$ to a saturated aqueous solution of NaOH. The $Co(OH)_2$ precipitate was washed with hot water until the filtrate was neutral to litmus. It was then washed with acetone and dried in a stream of $N_2$. $Co(OH)_2$ is easily oxidized when aqueous hydroxide is present. Oxidation is much slower in neutral solution and slower still in the dry state, but if stored for any length of time, the $Co(OH)_2$ must be sealed in an inert atmosphere.

The acetylacetonethylenediamine was made by adding a stoichiometric amount of ethylenediamine to acetylacetone. The white crystalline compound was washed with ice cold water.

The bright orange Co(acacen) is soluble in nonpolar organic solvents but not in water. The black oxidation product $[Co(acacen)]_2 O$ is soluble in hot water but not in nonpolar organic solvents. The Co(acacen) was purified by washing it with hot water, followed by crystallization from benzene solution. It was dried in a stream of $N_2$.

This method of synthesis gave yields ranging from 60% to 80% of theoretical expectation.

Preparation of Divinylbenzene Polymer

This polymer can be prepared by suspension polymerization using, for instance, 4 ml technical grade divinylbenzene (55% ortho and para divinylbenzene, 15% ethyl-vinylbenzene, 20% diethylbenzene, and 10% nitrogen-containing impurities), 4 ml toluene, 2 ml n-heptane, and 82 ml water with 0.1 g sodium lauryl sulfate dissolved in it. The polymerization reactions are carried out with continuous agitation in an oven at 110° C. for 20 hours. A more detailed description of this suspension polymerization process has been reported by Woeller and Pollock [Synthesis of Porous Polyaromatic Column Packing for GC Analysis of Extraterrestrial Atmosphere, J. chromatographic Sci., Vol 16, pp. 137–140 (April 1978)]. The first stage polymer can also be prepared, for example, by the polymerization of a mixture containing 30% technical grade divinyl benzene and 70% diethylbenzene heated at 110° C. for 20 hours.

After polymerization at 110° C. in the presence of inert organic diluent such as toluene, heptane or diethylbenzene, the polymer made by either method has a considerable number of unreacted vinyl groups because of incomplete crosslinking. At this stage, the polymer is washed with acetone, dried with a stream of air, and sieved to a mesh range of about 74 to 149 microns.

The invention will now be illustrated by means of the following examples which describe preferred embodiments, but are not intended to limit the scope of the claims accompanying this specification. In these examples, all gas mixtures are expressed on a volume basis.

EXAMPLE 1

To dry, finely divided divinylbenzene polymer prepared by emulsion polymerization, as described above, was added a 2% weight/volume solution of Co(acacen) in benzene in a quantity sufficient to yield a product containing about 10% by weight of the chelate compound. The benzene was evaporated off with heat in a nitrogen stream. The dry polymer with Co(acacen) dispersed on it was then sealed in an inert atmosphere and heated at 150° C. for twelve hours or more to complete the crosslinking of the polymer and the incorporation of the chelate into the matrix.

The Co(acacen)-polymer complex was saturated with hexane to the point where the particles still remained separate, any excess heptane being dried off by a stream of nitrogen. The resulting slush was resieved to a mesh range of about 74 to 149 microns. The saturation of the polymer with hexane, a liquid in which Co(acacen) is sparingly soluble, serves to retard the irreversible oxidation of the chelate by the oxygen in air. The hexane was removed with heat in a stream of nitrogen.

EXAMPLE 2

To the polymer-chelate complex prepared according to Example 1 was added a solution of aminopyridine in benzene containing 0.1 g of the base per milliliter of solvent. The quantity of base added was sufficient to provide two to four times as many base molecules as Co(acacen) molecules on the polymer. The polymer was then packed into four-foot columns with an inside diameter of 1 mm, using a continuous stream of carbon dioxide. Excess base and benzene were then removed from the column with helium flow at room temperature for 12 hours or more.

Columns filled with polymer-chelate complexes prepared according to Examples 1 and 2 with or without further processing variations, were used, as shown in the following examples, for the separation of various oxygen, carbon dioxide and nitrogen mixtures. For oxygen-nitrogen separation, the column was put in the chromatograph with helium carrier gas set at a flow rate of 20 to 24 cc per minute. Chromatograms were taken at room temperature when baseline stabilization was achieved at 20 mV full scale. In the case of polymers not containing any nitrogenous base, added hexane was dried off the column at 100° C. for two hours with a helium flow of 20 to 25 cc per minute before stabilization at room temperature with 20 mV full scale. For carbon monoxide-nitrogen separation, the column was heated at 150° C. for 12 hours or more with a helium flow rate of 20 to 24 cc per minute. Again, chromatograms were taken at room temperature where baseline stabilization was achieved at 20 mV full scale.

A model DSR Sargent Recorder with a Carle Model 100 microdetector control bridge and thermal detector, was used to take the chromatograms.

EXAMPLE 3

Various divinylbenzene polymers were prepared by suspension polymerization as described earlier, using 4 volumes of technical grade divinylbenzene, 82 volumes of soapy water, and 6 volumes of organic diluent. With the diluent volume remaining constant, the ratio of its components, i.e., heptane and toluene, was changed for each polymer preparation to cover the range of 0:6 to 6:0. The resulting polymers, after combination with Co(acacen) and priming with air, were used to separate 1% air in helium.

The priming with air, which is necessary before a column can separate oxygen from nitrogen when the first stage polymer has been prepared with a heptane-toluene diluent, is carried out by injecting the column with 100% air one to four times before the separation of oxygen becomes evident. When the column is left on with helium flowing through it for one half hour or more at a flow rate of about 20 cc per minute, re-priming is necessary. On the other hand, air priming is not needed when the first polymerization stage diluent is diethylbenzene.

The effect of the heptane-toluene ratios tested are shown in FIG. 1 where chromatograms depicted were obtained over a period of 1 minute for 1% air in helium, 20 mV full scale, Co(acacen) contents of 0.1 g per gram of polymer and heptanetoluene ratios of 0:6, 1:5, 2:4, 3:3, 4:2, 5:1, and 6:0, respectively. An examination of these chromatograms demonstrates the necessity for the presence of a certain concentration of an inert inorganic diluent such as heptane during the first stage of polymerization. To be noted in that respect is the lack of separation when heptane is absent (0:6) or is present in insufficient concentrations (1:5). It also becomes evident from these data that heptane-toluene ratios approaching 3:3, or rather 1:1, yield the best polymer for the purpose at hand.

EXAMPLE 4

Air, 1.0% in helium, was chromatographed in columns filled with stationary phases prepared as in Examples 1 to 3, except for the following process changes. One column (A) contained crosslinked divinylbenzene polymer, but no Co(acacen). Two other columns contained 0.1 g Co(acacen) per gram polymer, but in one case the polymer was not completely crosslinked (B) while being so in the other (C).

Figure 2:
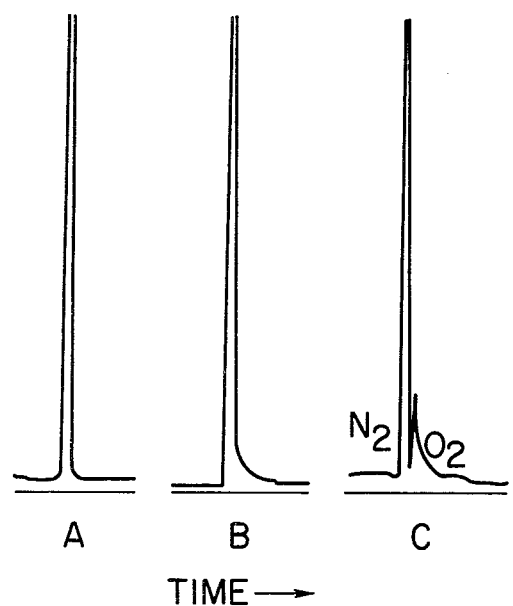
FIG. 2 illustrates the effect of crosslinking in the polymer on separation of oxygen-nitrogen mixtures.

As evidenced by the chromagrams of FIG. 2, no separation of oxygen from nitrogen takes place on four foot one millimeter columns unless the chelate is present and the polymer is fully crosslinked.

EXAMPLE 5

Air, 100%, was chromatographed as in Example 4 on four foot one millimeter columns containing the following packings:

|  | STATIONARY PHASE | | | | |
|---|---|---|---|---|---|
|  | A | B | C | D | E |
| Heptane: toluene ratio | 3:3 | 3:3 | 2:4 | 3:3 | 3:3 |
| g Co(acacen)/g polymer | 0.1 | 0.1 | 0.1 | 0.1 | 0.025 |
| Coordinated base | — | pyr* | pyr | cyano-pyr | pyr |

*pyr = pyridine

The concentration of the base, when used, was two to four times as great as that of the Co(acacen) concentration.

Figure 3:
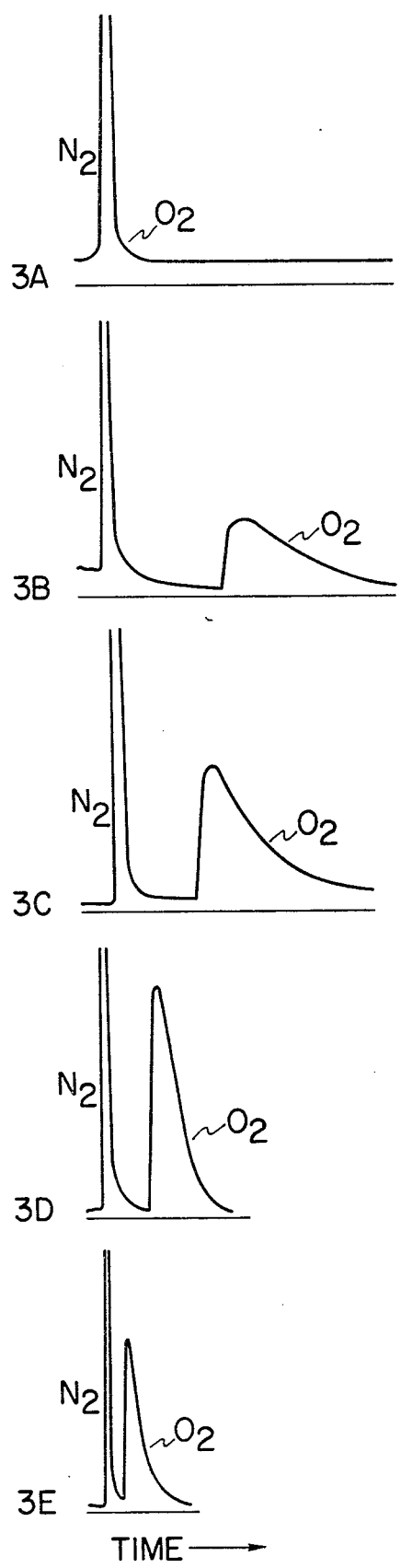
FIG. 3 demonstrates that various factors influence the oxygen retention time during chromatography on chelate-polymer complexes. The factors represented are the heptane-toluene ratio during the first stage polymerization, the chelate content of the polymer, the presence of a nitrogenous base, and the nature of such base.

The results of these runs appear in FIG. 3 from which it can be observed that the separation of oxygen from 100% air does not take place in the absence of a nitrogenous organic base in coordination with the fixed chelate (A v. B to E). The chromatograms also indicate that the retention time of oxygen on the polymer-chelate complex may be affected in different directions by varying the nature of the coordinating base (B v. D), the chelate content of the polymer-chelate complex (B v. E), and the ratio of components in the inert diluent used in the first stage polymerization of the packing matrix (B v. C).

EXAMPLE 6

Mixtures of carbon monoxide, oxygen, and nitrogen were chromatographed in 1 mm diameter columns at room temperature with a helium flow rate of 20 to 24 cc per minute in the manner described in previous examples, except for the following changes:

|  | RUN | | |
|---|---|---|---|
| Gas Mix | A | B | C |
| CO (%) | 0.2 | 0.2 | 0.1 |
| N$_2$ (%) | 0.2 | 0.2 | 0.1 |
| O$_2$ (%) | — | — | 0.2 |
| He (%) | 99.6 | 99.6 | 99.6 |
| Column (1 mm diameter) | | | |
| length (feet) | 4 | 4 | 4* + 4* |
| g chelate/g polymer | — | 0.05** | 0.20   0.05** |
| base | — | amino pyridine | amino pyridine |

*columns in tandem, operated at 20 to 24 cc gas flow per minute.
**treated at 200° C. for 24 hours with an He flow of 20 to 24 cc/minute before chromatography.

As may be seen from the resulting chromatograms, which are reproduced in FIG. 4, the polymer-chelate complex of the invention will quickly resolve mixtures containing nitrogen, carbon monoxide and oxygen (B and C), a performance that the polymer matrix alone cannot achieve (A).

EXAMPLE 7

A mixture of carbon monoxide, oxygen, and argon was chromatographed in 1 mm diameter columns at room temperature with a helium plow rate of 20 to 24 cc per minute in the manner described in Example 4, except for the following changes:
  Gas mix: CO, 1.5%; O$_2$, 0.4%, Ar, 0.3%; He, balance;
  Polymer: divinylbenzene polymerized in diethylbenzene;

Chelate: 0.1 g Co(acacen)/g polymer;
Base: aminopyridine;
CO/N$_2$ column */**: run A, 7 feet; run B, 11 feet;
O$_2$ column *: runs A and B, 4 feet.

* a CO/N$_2$ column and an O$_2$ column were used in tandem for each run.
** CO/N$_2$ colums were treated at 200° C. for 24 hours with an He flow of 20 to 24 cc/minute before chromatography.

Figure 5:
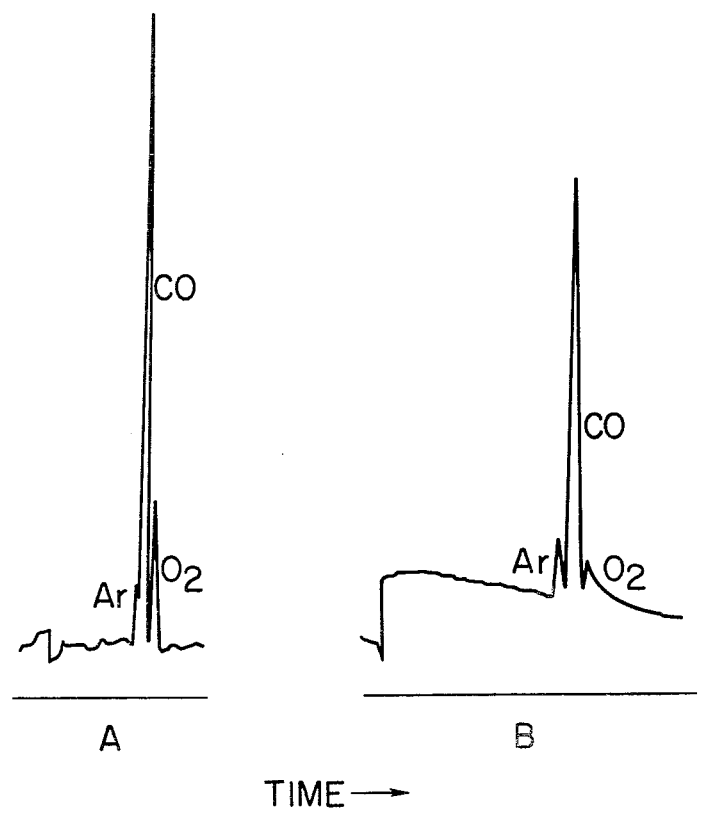
FIG. 5, on the other hand, shows the separation of mixtures of carbon monoxide, oxygen and argon by means of the same complexes.

As shown in FIG. 5, the chromatograms obtained in this manner show that the components of this argon, carbon monoxide, and oxygen mixture can be separated by the chelate-polymer complex of this invention.

What is claimed is:

1. As the stationary phase in a gas chromatograph apparatus, a polymer-chelate complex comprising (1) a microporous crosslinked polymer matrix consisting essentially of a copolymer of at least one monocyclic divinyl compound and at least one monocyclic monovinyl compound, into which is embedded (2) a chelate selected from cobalt and iron inorganic complexed ion compounds.

2. The polymer-chelate complex of claim 1 in which the complexed ion compound is coordinated with an organic nitrogenous base.

3. The polymer-chelate complex of claim 1, wherein the microporous matrix is a copolymer of divinylbenzene with a minor proportion of a monovinyl benzene and the chelate is a complexed cobalt ion.

4. The polymer-chelate complex of claim 4 wherein the chelate is coordinated with an organic base selected from the class consisting of pyridines, imidazoles and pyrazoles.

5. The polymer-chelate complex of claim 3 wherein the monovinyl benzene is ethylvinyl benzene and the complexed cobalt ion is N,N'-ethylenebis-(acetylacetoniminato)-cobalt (II).

6. The complex of claim 5 wherein the chelate is present at the level of about 0.025 to about 0.25 parts for each part of polymer, on a weight basis.

7. The polymer-chelate complex of claim 6 wherein the chelate is coordinated with about 2 to 4 concentrations of a nitrogenous base per concentration of chelate on the polymer, said base being selected from the group consisting of pyridine, aminopyridine, cyanopyridine, and vinyl pyridine.

8. A process for the preparation of a polymer-chelate complex for chromatographic use, which comprises:
    (a) forming a microporous first stage polymer matrix by the polymerization of a monomeric mixture comprising a major proportion of divinyl benzene and a minor proportion of ethylvinyl benzene, in an organic nonpolar inert liquid diluent;
    (b) adding to the finely divided first stage polymer a benzene solution of N,N'-ethylenebis-(acetylacetoniminator)-cobalt (II) in a quantity and at a concentration sufficient to provide a polymer-chelate complex having between about 0.025 to 0.25% by weight of chelate per gram of polymer; and
    (c) crosslinking the polymer by heating the mixture in an inert atmosphere until the reaction is completed.

9. The process of claim 8 wherein a pyridine base dissolved in benzene is added to the polymer-chelate complex in a quantity such that the concentration of base in the complex is ultimately two to four times as great as that of the chelate.

10. The process of claim 8 wherein the diluent is diethylbenzene or an about equal volume mixture of n-heptane and toluene.

* * * * *